United States Patent
Ma et al.

(10) Patent No.: US 11,292,718 B2
(45) Date of Patent: Apr. 5, 2022

(54) PROCESS FOR PREPARING SULFUR FROM REDUCTION OF SULFATE/ NITRATE BY IRON-CARBON AND RECOVERING DESULFURIZATION/ DENITRATION AGENTS

(71) Applicant: SHANDONG UNIVERSITY, Shandong (CN)

(72) Inventors: Chunyuan Ma, Jinan (CN); Xiao Xia, Jinan (CN); Lin Cui, Jinan (CN); Liqiang Zhang, Jinan (CN); Xiqiang Zhao, Jinan (CN); Jun Li, Jinan (CN); Tai Feng, Jinan (CN); Shizhen Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 171 days.

(21) Appl. No.: 16/618,937

(22) PCT Filed: Dec. 27, 2018

(86) PCT No.: PCT/CN2018/124115
§ 371 (c)(1),
(2) Date: Dec. 3, 2019

(87) PCT Pub. No.: WO2020/124655
PCT Pub. Date: Jun. 25, 2020

(65) Prior Publication Data
US 2021/0331922 A1    Oct. 28, 2021

(30) Foreign Application Priority Data
Dec. 17, 2018    (CN) .......................... 201811542403.3

(51) Int. Cl.
*B01D 1/28*    (2006.01)
*B01D 39/12*    (2006.01)
(Continued)

(52) U.S. Cl.
CPC ................ *C01B 17/05* (2013.01); *B01D 1/28* (2013.01); *B01D 39/12* (2013.01);
(Continued)

(58) Field of Classification Search
CPC . C01B 17/0259; C01B 17/0264; C01B 21/02; B01D 53/501; B01D 53/56;
(Continued)

(56) References Cited

U.S. PATENT DOCUMENTS

| | | | | | |
|---|---|---|---|---|---|
| 3,438,733 | A | * | 4/1969 | Grantham | ............... C01B 17/05 423/578.4 |
| 3,460,912 | A | * | 8/1969 | Squires | ................. C01B 17/164 423/574.1 |
| 4,828,816 | A | * | 5/1989 | Kostylkov | .......... C01B 17/0264 423/567.1 |

FOREIGN PATENT DOCUMENTS

| | | |
|---|---|---|
| CN | 101700463 A | 5/2010 |
| CN | 101732948 A | 6/2010 |

(Continued)

OTHER PUBLICATIONS

Sep. 18, 2019 Written Opinion of the International Searching Authority issued in International Patent Application No. PCT/CN2018/124115.

(Continued)

*Primary Examiner* — Timothy C Vanoy
(74) *Attorney, Agent, or Firm* — Oliff PLC

(57) ABSTRACT

The present invention discloses a process for preparing sulfur from reduction of sulfate/nitrate by iron-carbon and recovering desulfurization/denitration agents. High-concentration $SO_2$ flue gas produced by calcination of a sulfate and NOx produced by heating decomposition of a nitrate can be directly reduced to elemental sulfur vapor and $N_2$ through reaction with an iron-carbon material at a high temperature. Then, after dust removal, cooling and fine dust removal, (Continued)

sulfur is recovered by a sulfur recovery device, and metal oxides can replace alkaline mineral resources such as limestone as raw materials of desulfurization (denitration) agents. This process can recycle the desulfurization and denitration agents.

10 Claims, 1 Drawing Sheet

(51) Int. Cl.
| | |
|---|---|
| B01D 39/20 | (2006.01) |
| B01D 53/50 | (2006.01) |
| B01D 53/56 | (2006.01) |
| B01D 53/80 | (2006.01) |
| B03C 3/16 | (2006.01) |
| C01B 17/04 | (2006.01) |
| C01B 17/05 | (2006.01) |

(52) U.S. Cl.
CPC ....... *B01D 39/2068* (2013.01); *B01D 53/502* (2013.01); *B01D 53/56* (2013.01); *B01D 53/80* (2013.01); *B03C 3/16* (2013.01); *C01B 17/0482* (2013.01); *B01D 2251/402* (2013.01); *B01D 2251/404* (2013.01); *B01D 2251/604* (2013.01); *B01D 2257/302* (2013.01); *B01D 2257/402* (2013.01); *B01D 2257/404* (2013.01)

(58) Field of Classification Search
CPC .. B01D 53/74; B01D 53/78; B01D 2257/302; B01D 2257/402; B01D 2257/404; B01D 2258/0283; B01J 19/00; B01J 2219/00; B01J 2219/00002
See application file for complete search history.

(56) References Cited

FOREIGN PATENT DOCUMENTS

| | | | |
|---|---|---|---|
| CN | 103861439 A | 6/2014 | |
| CN | 104162358 A | 11/2014 | |
| CN | 108706784 A | 10/2018 | |
| JP | S5318476 A | 2/1978 | |
| RU | 2006456 C1 * | 1/1994 | ............ C01B 17/02 |

OTHER PUBLICATIONS

Sep. 18, 2019 International Search Report issued in International Patent Application No. PCT/CN2018/124115.

* cited by examiner

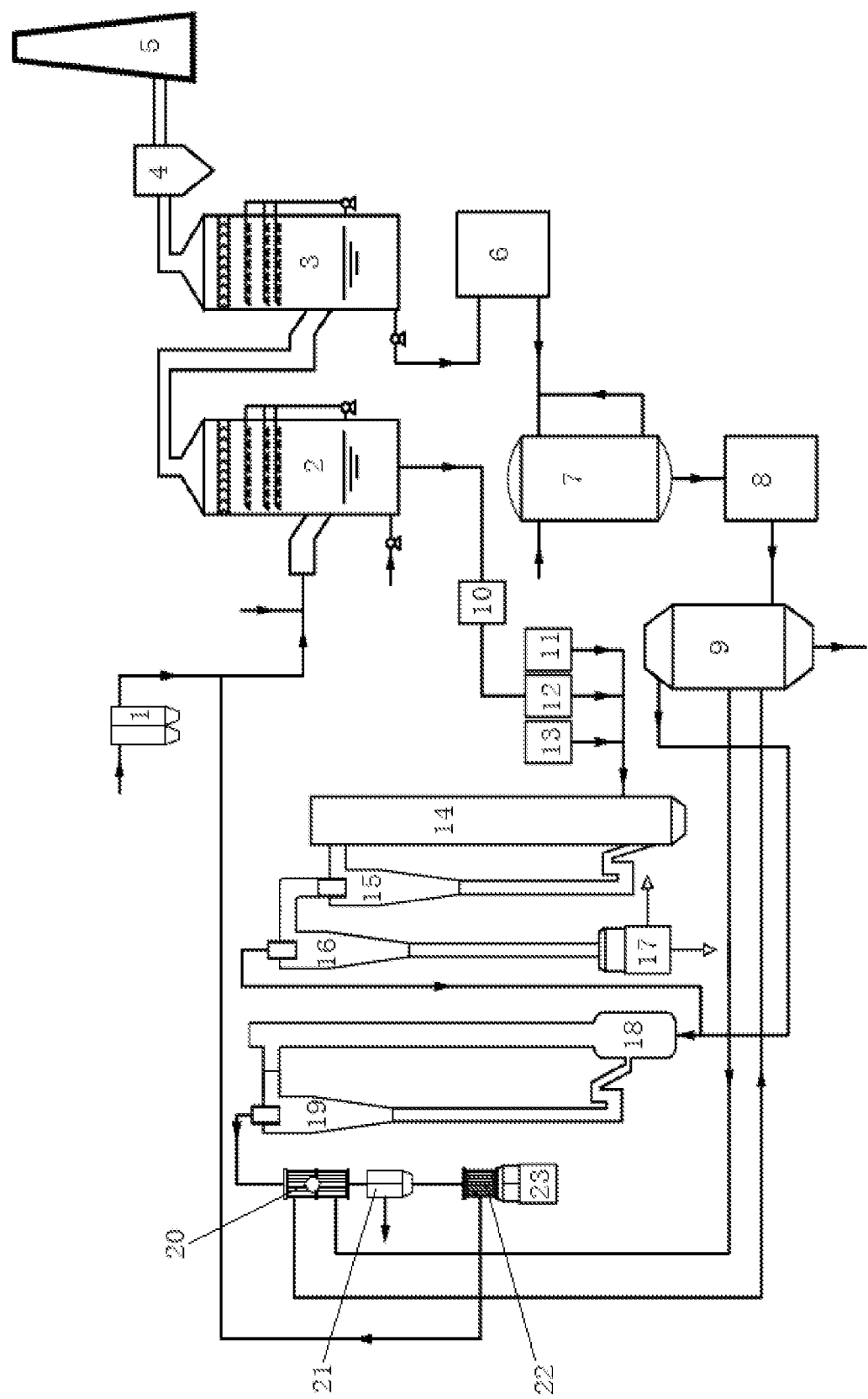

PROCESS FOR PREPARING SULFUR FROM REDUCTION OF SULFATE/ NITRATE BY IRON-CARBON AND RECOVERING DESULFURIZATION/ DENITRATION AGENTS

FIELD OF THE INVENTION

The present invention belongs to the field of resource utilization of pollutants, and specifically relates to a system and method for preparing sulfur from reduction of sulfate (nitrate) by iron-carbon and recovering desulfurization (denitration) agents.

BACKGROUND OF THE INVENTION

With the continuous increasing of environmental protection requirements in China, desulfurization and denitration devices are required for flue gas containing sulfur and NOx discharged from coal-fired power plants, steel plants, etc. Among them, wet desulfurization units, mainly based on a limestone-gypsum method, account for about 85% of the total installed capacity. This technology has the advantages of high desulfurization efficiency, stable operation and the like, but needs to consume a large amount of limestone. Overexploitation of the limestone destroys the ecological environment. In addition, the desulfurization byproduct is low-quality desulfurization gypsum, which mainly contains $CaSO_4 \cdot 2H_2O$ and also contains a small amount of other metal ion sulfates, so the desulfurization gypsum is low in value and difficult to use. At present, the annual output of desulfurization gypsum in China is huge, about 100 million tons. The desulfurization gypsum, which is difficult to handle, has caused great harm to the environment.

Ozone denitration technology is more suitable for increasingly strict environmental protection requirements than conventional flue gas desulfurization and denitration processes SCR and SNCR. The advanced oxidation technology using ozone has good removal effects on not only NOx but also other harmful pollutants (e.g., heavy metal mercury, etc.) in the flue gas. Denitration processes such as oxidation absorption at low temperatures are beneficial to the energy recovery and utilization of boilers, and reduce the difficulty of engineering construction. With the use and improvement of the existing mature wet desulfurization process in China, desulfurization and denitration can be implemented simultaneously. The denitration reaction is controlled by a special process to oxidize NOx into high-valence oxides, and the high-valence oxides are then absorbed using alkali solutions, so that the denitration efficiency is high, and the requirement for ultra-low emission can be met. However, nitrates are very soluble in water, the metal ions in the nitrates have great harm to the equipment, and the formed denitration waste liquid is difficult to handle, causing secondary pollution.

Most of the existing flue gas sulfur resource recovery technologies are for the preparation of sulfuric acid, but the sulfuric acid is difficult to store and transport, with low utilization value. Sulfur has the lowest molecular weight and high unit value in all sulfur-containing products, is low in storage and transportation costs, and can be widely used as a raw material for most sulfur-containing products. China is also a country with a shortage of sulfur resources, the annual import and consumption of sulfur is among the highest ones in the world, and the external dependence is high. Sulfur is one of the important chemical raw materials, and its market value and application value are far greater than those of sulfuric acid.

SUMMARY OF THE INVENTION

In order to solve the technical problems existing in the prior art, the present invention is directed to provide a system and method for preparing sulfur from reduction of sulfate/nitrate by iron-carbon and recovering desulfurization/denitration agents. The system and method can not only alleviate the problem that sulfates (mainly calcium sulfate) and nitrate waste liquid produced by denitration in China are difficult to handle, but also achieve resource utilization of waste solid and waste liquid. The present invention can recover desulfurization and denitration agents while preparing sulfur to achieve cyclic utilization of the desulfurization and denitration agents, reduce the exploitation of mineral resources such as limestone, protect the ecological environment, also alleviate the shortage of sulfur resources in China, and reduce the external dependence of sulfur resources.

In order to solve the above technical problems, the present invention provides the technical solution of:

A system for preparing sulfur by reduction of sulfate/nitrate by iron-carbon and recovering desulfurization/denitration agents, including a desulfurization tower, a denitration tower, a chimney, a drying device, a roaster for reduction, a first separator, a second separator, a thermal reduction tower using carbon, a third separator, a reheater, a fine dust removing device, a sulfur recovery device, a sulfur storage bin, a concentration device, a pneumatic transporting device, and a nitrate decomposition tower, wherein a flue gas inlet of the desulfurization tower is connected to a flue gas source, a flue gas outlet of the desulfurization tower is connected to a flue gas inlet of the denitration tower, a flue gas outlet of the denitration tower is connected to an inlet of a wet electrostatic precipitator, and an outlet of the wet electrostatic precipitator is connected to an inlet of the chimney;

a tower kettle of the desulfurization tower is connected to an inlet of the drying device, an outlet of the drying device is connected to an inlet of a sulfate bin, and the roaster for reduction is connected to an iron powder source, a carbon powder source and the sulfate bin;

a tower kettle of the denitration tower is connected to an inlet of the concentration device, an outlet of the concentration device is connected to an inlet of the nitrate decomposition tower through the pneumatic transporting device, and a gas outlet of the nitrate decomposition tower is connected to an inlet of the thermal reduction tower using carbon;

an outlet of the roaster for reduction is connected to the first separator, a solid outlet of the first separator in communication with the interior of the roaster for reduction, a gas outlet of the first separator is connected to an inlet of the second separator, and a solid outlet of the second separator is connected to a filtering device;

a gas outlet of the second separator is connected to the inlet of the thermal reduction tower using carbon, an outlet of the thermal reduction tower using carbon is connected to an inlet of the third separator, a gas outlet of the third separator is connected to the reheater, and the reheater, the fine dust removing device, the sulfur recovery device and the sulfur storage bin are connected in sequence.

A solid outlet of the third separator is connected to the thermal reduction tower using carbon;

The calcination decomposition temperature of sulfate is between 1350° C. and 1400° C. However, after the addition of an iron-carbon material, the calcination decomposition temperature of the sulfate is greatly reduced to about 700° C. to 1100° C. The reduction of temperature reduces the consumption of energy. At the same time, the reduced temperature is identical to the optimum temperature of the process for preparing sulfur by carbon thermal reduction of $SO_2$, which can greatly improve the conversion rate to sulfur products. The sulfate is calcined to obtain solid metal oxides and high-concentration $SO_2$ gas as its main components. Some of the $SO_2$ gas can be directly subjected to carbon thermal reduction with carbon powder in the fluidized bed roaster tower to generate elemental sulfur. The iron powder can be added to facilitate the $SO_2$ reduction, which is beneficial to increase the conversion rate of $SO_2$. The remaining $SO_2$ gas flows out of the roaster for reduction along with the calcined flue gas.

The elemental sulfur is in a state of gas at a high temperature in the fluidized bed roaster tower, a roasting slag is carried in the gas stream flowing out from the outlet of the fluidized bed roaster tower, and the roasting slag includes unroasted sulfate, metal oxides and carbon powder, wherein the unroasted sulfate of highest specific gravity is separated down by the first separator, and then returned to the fluidized bed roaster for reduction for flowing reaction; and the metal oxides and carbon powder of lower specific gravity as well as reducing gas are introduced into the second separator, the second separator separates the metal oxides and the carbon powder down from the reducing gas, and the separated metal oxides and carbon powder are introduced into the filtering device. The reducing gas carrying a small amount of unseparated roasting slag from the second separator is introduced into the thermal reduction tower using carbon, and the $SO_2$ in the reducing gas reacts with the carbon material to generate elemental sulfur vapor. The reducing gas carrying the powdery carbon material from the thermal reduction tower using carbon is introduced into the third separator, and the carbon powder separated down therein is returned to the thermal reduction tower using carbon. The reducing gas is introduced into the reheater to be cooled, and the energy released by this portion of reducing gas can be fully utilized according to the specific circumstance. The cooled reducing gas is introduced into the fine dust removing device, and the small amount of roasting slag not separated by the first two high-temperature separators is filtered out therein. Finally, the reducing gas is introduced into the sulfur recovery device such that the sulfur is recovered and stored in the sulfur storage bin, and the remaining exhaust gas is returned to a flue gas purification system of the large system.

Nitrate has poor thermal stability, and emits oxygen when decomposed by heating. According to different activities of metal ions in nitrate, the decomposition temperature is also different. The nitrate solution formed by the common ozone oxidation-wet denitration process, such as sodium nitrate solution, is decomposed above 400° C. into sodium oxides, $N_2$, $O_2$ and NOx, the solid metal oxides produced by decomposition can be recycled as denitration agents, and the gas product after concentration is fed into the thermal reduction tower using carbon, so that in the presence of an iron-carbon catalyst, the reduction temperature of NOx is reduced, and the conversion rate of NOx can be improved.

The high-concentration $SO_2$ flue gas produced by the calcination of sulfate and the NOx produced by the thermal decomposition of nitrate can be directly reduced to elemental sulfur vapor and $N_2$ by reaction with an iron-carbon material at a high temperature. Then, after dust removal, cooling and fine dust removal, the sulfur is recovered by the sulfur recovery device, and the metal oxides can replace alkaline mineral resources such as limestone as raw materials of desulfurization (denitration) agents. This process can recycle the desulfurization and denitration agents.

Preferably, the filtering device is provided with a chamber therein, a filter screen is disposed across the cross section of the chamber, a first outlet is disposed at the upper end of the filter screen, and a second outlet is disposed at the lower end of the filter screen.

The filtering device is provided with the chamber into which a water is continuously introduced, the water dissolves the fell metal oxides to obtain an alkali liquid, the alkali liquid flows out from the second outlet of the filtering device and is delivered to the desulfurization tower for desulfurization, the filter screen intercepts the water-insoluble carbon powder, and the intercepted solid slurry flows out from the first outlet of the filtering device and is dried and then fed into the fluidized bed roaster for reduction and burned.

Preferably, the flue gas inlet of the desulfurization tower is connected to a first dust collector. The first dust collector can remove dust from the flue gas, thereby reducing the content of solid particles in the flue gas, and improving the operating condition in the desulfurization tower.

Further preferably, a flue between the first dust collector and the desulfurization tower is connected to an ozone generator.

The ozone generator introduces ozone into the flue gas after dust removal. The ozone oxidizes NOx (mainly NO, about 95% by volume) in the flue gas into high-order oxides of nitrogen, mainly $NO_3$, $N_2O_5$, etc., and oxidizes $SO_2$ in the flue gas into $SO_3$. During desulfurization and denitration, the high-order oxides of nitrogen and sulfur trioxide in the flue gas react with the alkali liquid to generate nitrates and sulfates.

Preferably, a second dust collector is connected between the denitration tower and the chimney. The second dust collector can further remove dust from the flue gas to ensure the cleanliness of the flue gas to be emitted into the atmosphere.

Preferably, the first dust collector and the second dust collector are bag-type dust collectors, cyclone separators, axial flow separators or electrostatic precipitators.

Preferably, the concentration device includes a membrane concentration device and an MVR evaporation concentration device, an inlet of the membrane concentration device is connected to the tower kettle of the denitration tower, an outlet of the membrane concentration device is connected to an inlet of the MVR evaporation concentration device, and the pneumatic transporting device is disposed at the outlet of the MVR evaporating concentration device.

The membrane concentration device and the MVR evaporation concentration device perform a secondary concentration on the nitrate solution to ensure that the nitrate in the nitrate solution is crystallized into a powdery solid.

Preferably, a feeder is disposed between the drying device and the roaster for reduction.

All the fluidized bed roasters are: roaster for reduction+ thermal reduction tower using carbon. The thermal reduction tower using carbon may be in various forms such as a fluidized bed, an entrained flow bed, or a bubbling bed.

The roaster for reduction may be in various forms such as an entrained flow bed, a fluidized bed, a boiling bed, or a rotary kiln.

Further preferably, the feeder is a screw feeder or an air-lock feeder.

Preferably, the fine dust removing device is a metal mesh filter or a ceramic filter.

A process for preparing sulfur by reduction of sulfate/nitrate by iron-carbon and recovering desulfurization/denitration agents, including the following steps:

a flue gas is subjected to dust removal, ozone oxidation, alkali washing desulfurization, and alkali washing denitration, and then discharged;

a sulfate precipitate produced in the desulfurization process is dried and then transported together with carbon powder and iron powder at a set ratio to a roaster for reduction for roasting reduction at a roasting temperature of 800° C. to 1100° C. for a roasting time of 4 to 200 s. The heat for the roasting reduction is supplied by a burner. The fuel for the burner may be a pulverized coal, a natural gas, a gasoline, a diesel, or the like;

a nitrate solution produced in the denitration process is concentrated and crystallized to produce a nitrate powder, the nitrate powder is decomposed at a high temperature into a solid metal oxide and a mixed gas, and the mixed gas is delivered to the roaster for reduction such that the mixed gas is reduced to nitrogen by roasting;

a unroasted sulfate of high specific gravity carried in the gas flowing out from an outlet of the roaster for reduction is separated down by a first separator, and then the separated sulfate is returned to the fluidized bed roaster for reduction for further reaction; a metal oxide and carbon powder of low specific gravity are separated down by a second separator and fed into a filtering device, the metal oxides are dissolved in the water of the filtering device to form an alkali liquid, and the carbon powder is intercepted by the filtering device and dried for reuse;

the roasting gas is subjected to a dust removal by condensing and a sulfur recovery, and then sequentially introduced into a desulfurization tower and a denitration tower for treatment, and finally discharged.

Preferably, the sulfate transported to the roaster for reduction has a particle diameter of 60 µm to 3 mm, the nitrate has a particle diameter of 60 µm to 3 mm, the carbon powder has a particle diameter of 60 µm to 3 mm, and the iron powder has a particle diameter of 60 µm to 500 µm.

Further preferably, the mass ratio of the sulfate, the carbon powder, and the iron powder in the roaster for reduction is (8-11):(1-2):(1-2).

Preferably, the temperature for high-temperature decomposition of the nitrate powder is 400 to 600° C., and the reaction time is 10 to 200 s.

The present invention has the following advantages:

The present invention proposes a process and device for preparing sulfur from reduction of sulfate/nitrate by iron-carbon and recovering desulfurization (denitration) agents. Waste sulfate solid and waste nitrate liquid produced in the wet desulfurization-ozone denitration process for flue gas are thermally treated using a fluidized bed roaster for reduction, a nitrate decomposition tower, a membrane concentration device, an MVR evaporation concentration device, high-temperature separators, a sulfur recovery device, etc. by accurately controlling the reaction temperature and the reaction condition, so that desulfurization (denitration) agents are recycled while sulfur is prepared and sulfur resources are recovered from waste solid, therefore the current situation of shortage of sulfur resources in China can be alleviated, the external dependence of sulfur resources is reduced, the resource utilization of sulfates is achieved, a new sustainable and pollution-free treatment method is provided for the waste sulfate solid that is difficult to treat at present, and the process and device have great significance for relevant industries of wet desulfurization-ozone denitration and the like and have broad market prospects.

BRIEF DESCRIPTION OF THE DRAWING

The drawing accompanying the Description and constituting a part of the present application is used for providing a further understanding of the present application, and the exemplary embodiments of the present application and the descriptions thereof are used for interpreting the present application, rather than constituting improper limitations to the present application.

FIG. 1 is a structural schematic diagram of a system for preparing sulfur from reduction of sulfate (nitrate) by iron-carbon and recovering desulfurization (denitration) agents.

In which: 1 first dust collector, 2 desulfurization tower, 3 denitration tower, 4 second dust collector, 5 chimney, 6 membrane concentration device, 7 MVR evaporation concentration device, 8 pneumatic transporting device, 9 nitrate decomposition tower, 10 drying device, 11 iron powder bin, 12 sulfate bin, 13 carbon material bin, 14 roaster for reduction, 15 first separator, 16 second separator, 17 filtering device, 18 thermal reduction tower using carbon, 19 third separator, 20 reheater, 21 fine dust removing device, 22 sulfur recovery device, 23 sulfur storage bin.

DETAILED DESCRIPTION OF EMBODIMENTS

It should be pointed out that the following detailed descriptions are all exemplary and aim to further illustrate the present application. Unless otherwise specified, all technological and scientific terms used in the descriptions have the same meanings as those generally understood by those of ordinary skill in the art of the present application.

It should be noted that the terms used herein are merely for describing specific embodiments, but are not intended to limit exemplary embodiments according to the present application. As used herein, unless otherwise explicitly pointed out by the context, the singular form is also intended to include the plural form. In addition, it should also be understood that when the terms "comprise" and/or "include" are used in the specification, they indicate presence of the features, steps, operations, devices, components and/or their combination.

As shown in FIG. 1, a system for preparing sulfur from reduction of sulfate (nitrate) by iron-carbon and recovering desulfurization (denitration) agents is provided and includes a desulfurization tower 2, a denitration tower 3, a chimney 5, a drying device 10, a roaster for reduction 14, a first separator 15, a second separator 16, a thermal reduction tower using carbon 18, a third separator 19, a reheater 20, a fine dust removing device 21, a sulfur recovery device 22, a sulfur storage bin 23, a concentration device, a pneumatic transporting device 8, and a nitrate decomposition tower 9, wherein a flue gas inlet of the desulfurization tower 2 is connected to a flue gas source through the first dust collector 1, a flue gas outlet of the desulfurization tower 2 is connected to a flue gas inlet of the denitration tower 3, and a flue gas outlet of the denitration tower 3 is connected to the chimney 5 through the second dust collector 4; the first dust collector 1 and the second dust collector 4 may be bag-type dust collectors, cyclone separators, axial flow separators or electrostatic precipitators.

A tower kettle of the desulfurization tower 2 is connected to an inlet of the drying device 10, an outlet of the drying device 10 is connected to the sulfate bin 12 through a feeder, and the roaster for reduction 14 is also connected to an iron powder bin 11, a carbon material bin 13 and a sulfate bin 12; and the feeder is a screw feeder or an air-lock feeder.

An outlet of the roaster for reduction 14 is connected to the first separator 15, a solid outlet of the first separator 15 is communicated with the interior of the roaster for reduction 14, a gas outlet of the first separator 15 is connected to an inlet of the second separator 16, a solid outlet of the second separator 16 is connected to the filtering device 17, the filtering device 17 is provided with a chamber therein, a filter screen is disposed across the cross section of the chamber, a first outlet is disposed at the upper end of the filter screen, and a second outlet is disposed at the lower end of the filter screen;

A gas outlet of the second separator 16 is connected to an inlet of the thermal reduction tower using carbon 18, an outlet of the thermal reduction tower using carbon 18 is connected to an inlet of the third separator 19, a gas outlet of the third separator 19 is connected to the reheater 20, and the reheater 20, the fine dust removing device 21, the sulfur recovery device 22 and the sulfur storage bin 23 are sequentially connected; the fine dust removing device 21 is a metal mesh filter or a ceramic filter. The structure of the sulfur recovery device 22 is substantially the same as that of a Claus process sulfur recovery device. A solid outlet of the third separator is connected to the thermal reduction tower using carbon 18.

The first separator 15 and the second separator 16 may be various types of separators such as high-temperature cyclone separators, or high-temperature axial flow separators.

A heat exchange medium for the reheater 20 may be of various types such as cooling water, air, heat conduction oil, or molten salt.

An inlet of a membrane concentration device 6 is connected to a tower kettle of the denitration tower 3, an outlet of the membrane concentration device 6 is connected to an inlet of an MVR evaporation concentration device 7, a pneumatic transporting device 8 is disposed at an outlet of the MVR evaporation concentration device 7, nitrate powder after concentration and crystallization is connected to an inlet of the nitrate decomposition tower 9 through the pneumatic transporting device 8, and a gas outlet of the nitrate decomposition tower 9 is connected to the thermal reduction tower using carbon 18.

Flue gas produced by pulverized coal combustion, mineral sintering, metal smelting and the like is first introduced into the first dust collector 1 to filter out soot in the flue gas, and the flue gas after dust removal is introduced with ozone for oxidation, wherein NOx (mainly NO, about 95% by volume) is oxidized into high-order oxides of nitrogen (mainly $NO_3$, $N_2O_5$, etc.), and $SO_2$ in the flue gas is oxidized into $SO_3$; the oxidized flue gas flows through the desulfurization tower 2, the denitration tower 3 and the second dust collector 4 in sequence, and then is discharged through the chimney 5.

Flue gas is introduced into the desulfurization tower 2, washed with alkaline desulfurization slurry and then introduced into the denitration tower 3, wherein the desulfurization agent is a metal alkaline solution which can form a precipitate with $SO_4^{2-}$ ions, and the common desulfurization agent is $Ca(OH)_2$, $Mg(OH)_2$, etc.; the alkaline desulfurization slurry reacts with $SO_3$ in the flue gas to form a sulfate precipitate, and the sulfate precipitate is dried by the drying device 10 and stored in the sulfate bin 12. The powdery sulfate stored in the sulfate bin 12, a powdery carbon material stored in the carbon material bin 13, and iron powder in the iron powder bin 11 are fed into the fluidized bed roaster for reduction 14 in a certain ratio for reduction roasting at a roasting temperature is 800° C. to 1100° C. for a roasting time of 4 to 200 s, with the excess air coefficient being less than 1, the heat required for roasting is provided by a burner at the bottom of the fluidized bed roaster for reduction 14, and the roasted product is powdery roasting slag and high-temperature flue gas. In the reduction roasting process, a high-temperature flue gas containing 5-30% of $SO_2$ and 5-25% of elemental sulfur vapor is first produced; the high-temperature flue gas carrying roasting slag is discharged from the roaster for reduction 14 and then introduced into the first separator 15, and the unroasted sulfate of highest specific gravity in the roasting slag is separated and returned to the fluidized bed roaster for reduction for continuous reaction; the metal oxides and carbon powder of lower specific gravity and reducing gas are fed into the second separator 16. In this process, the metal oxides and the carbon powder are separated down from the reducing gas and introduced into the filtering device 17, wherein the metal oxides react with water to form a corresponding alkali solution, the alkali solution is returned to the desulfurization tower 2 as a desulfurization agent for recycling, and the water-insoluble carbon powder is filtered, dried and fed into the roaster for reduction 14 for burning. The reducing gas carrying a small amount of unseparated roasting slag from the second separator 16 is introduced into the thermal reduction tower using carbon 18, wherein the high-concentration $SO_2$ is reduced to elemental sulfur vapor by a carbon material or reductive gas, the reducing gas carrying the powdery carbon material from the thermal reduction tower using carbon 18 is introduced into the third separator 19, and the carbon powder separated down therein is returned to the thermal reduction tower using carbon 18 for continuous reaction. The reducing gas is introduced into the reheater 20 to be cooled, and the energy released by this portion of reducing gas can be fully utilized according to the specific circumstance. The cooled reducing gas is introduced into the fine dust removing device 21 to filter out a small amount of unseparated roasting slag in the flue gas. Finally, the reducing gas is introduced into the sulfur recovery device 22 such that the sulfur recovered and stored in the sulfur storage bin 23, and the remaining exhaust gas is returned to a flue gas purification system of the large system.

The flue gas from the desulfurization tower 2 is introduced into the wet denitration tower 3, washed with an alkaline denitration slurry and then introduced into the second dust collector 4, and the flue gas after dust removal is discharged through the chimney 5; the alkaline denitration slurry reacts with high-order oxides of nitrogen (mainly $NO_3$, $N_2O_5$, etc.) in the flue gas to form a soluble nitrate solution; the nitrate solution is powered by a waste liquid pump, to passed sequentially through the membrane concentration device 6 and the MVR evaporation concentration device 7, such that the soluble nitrate is crystallized into powdery solid. The powdery solid is transported to the nitrate decomposition tower 9 by the pneumatic transporting device 8. In the nitrate decomposition tower 9, the nitrate is heated to 400° C. to 600° C., and reacts for 10 to 200 s, where the heat is supplied by the extra heat produced by the iron-carbon reduction system. The nitrate is decomposed at this temperature into solid metal oxides, $N_2$, $O_2$ and high-concentration NOx, wherein the solid metal oxides are returned to the denitration tower 3 as denitration agents for recycling, the gas is delivered to the roaster for reduction 14, and the NOx is catalytically reduced to pollution-free $N_2$ at a high temperature by the iron-carbon material. In the above gas delivery process, the delivery power is provided by an induced draft fan or a blower.

Air-lock feeders are disposed at the outlet of the carbon material bin 13, the sulfate bin 12, and the outlet of the iron powder bin 11 to ensure accurate control of the feed amount while keeping the airtightness of the system.

The roaster for reduction is provided with an external insulating layer outside and a burner at the bottom of a hearth to maintain the temperature in the roaster and promote the reaction.

$SO_2$ and a carbon material or reductive gas undergo an oxidation-reduction reaction in the environment of 500° C. to 1000° C., the reaction products are elemental sulfur vapor, $CO_2$, CO and other gases, and the reaction time is closely related to the reaction temperature, gas atmosphere, particle size, equivalence ratio, and gas-solid mixing.

Powdery roasting slag is separated from the reducing gas by the high-temperature separators, and the reducing gas is cooled by the reheater, then introduced into the fine powder separator for a secondary dust removal, and condensed by the sulfur condenser to recover sulfur. The purity of the recovered sulfur is more than 99.7%, which is in line with the first grade of industrial sulfur.

The metal oxides after decomposition in the decomposition tower react with water to form a corresponding alkali solution, and the alkali solution is returned to the denitration tower for recycling.

The fluidized bed roaster for reduction may be in various forms such as an entrained flow bed, a bubbling bed, a micro-fluidized bed, a spouted bed or a fluidized bed, or a U-shaped furnace, a π-shaped furnace or the like.

The sulfate has a particle diameter of 60 μm to 3 mm, and may be calcium sulfate, magnesium sulfate or other metal sulfate.

The nitrate has a particle diameter of 60 μm to 3 mm, and may be calcium nitrate, sodium nitrate or other metal nitrate.

The carbon material has a particle diameter of 60 μm to 3 mm, and may be pulverized coal, activated coke, activated semi-coke, activated carbon, carbonized material, graphite, etc.

The roasting slag has a particle diameter of 60 μm to 3 mm, contains unreacted sulfates, metal oxides and the like as main components, and also contains a small amount of impurities.

The alkaline desulfurization slurry may be an alkaline solution such as $Ca(OH)_2$ or $Mg(OH)_2$.

The alkaline denitration slurry may be an alkaline solution such as $NaSO_3$, NaOH or $Ca(OH)_2$.

The high-temperature flue gas has a temperature of 800° C. to 1100° C., and contains $N_2$, S vapor, $SO_2$, CO, $CO_2$ and the like as main components.

The reductive gas is mainly CO, and also contains a small amount of $H_2$, $CH_4$, etc.

The reducing gas has a temperature of 800° C. to 1100° C., and contains $N_2$, S vapor, CO, $CO_2$ and the like as main components.

The metal oxide has a particle diameter of 60 μm to 3 mm, and may be a metal oxide such as calcium oxide, sodium peroxide or magnesium oxide.

The burner may be fueled with pulverized coal, natural gas, diesel or the like.

Described above are merely preferred embodiments of the present application, and the present application is not limited thereto. Various modifications and variations may be made to the present application for those skilled in the art. Any modification, equivalent substitution, improvement or the like made within the spirit and principle of the present application shall fall into the protection scope of the present application.

The invention claimed is:

1. A system for preparing sulfur from reduction of sulfate/nitrate by iron-carbon and recovering desulfurization/denitration agents, the system comprising:

a desulfurization tower, a denitration tower, a chimney, a drying device, a roaster for reduction, a first separator, a second separator, a thermal reduction tower using carbon, a third separator, a reheater, a fine dust removing device, a sulfur recovery device, a sulfur storage bin, a concentration device, a pneumatic transporting device, and a nitrate decomposition tower, wherein a flue gas inlet of the desulfurization tower is connected to a flue gas supply source, a flue gas outlet of the desulfurization tower is connected to a flue gas inlet of the denitration tower, a flue gas outlet of the denitration tower is connected to an inlet of a wet electrostatic precipitator, and an outlet of the wet electrostatic precipitator is connected to an inlet of the chimney;

a tower kettle of the desulfurization tower is connected to an inlet of the drying device, an outlet of the drying device is connected to an inlet of a sulfate bin, the sulfate bin is connected to the roaster for reduction, and the roaster for reduction is also connected to an iron powder supply source and a carbon powder supply source;

a tower kettle of the denitration tower is connected to an inlet of the concentration device, an outlet of the concentration device is connected to an inlet of the nitrate decomposition tower through the pneumatic transporting device, and an outlet of the nitrate decomposition tower is connected to an inlet of the thermal reduction tower using carbon;

an outlet of the roaster for reduction is connected to the first separator, a solid outlet of the first separator is in communication with an interior of the roaster for reduction, a gas outlet of the first separator is connected to an inlet of the second separator, and a solid outlet of the second separator is connected to a filtering device;

a gas outlet of the second separator is connected to the inlet of the thermal reduction tower using carbon, an outlet of the thermal reduction tower using carbon is connected to an inlet of the third separator, a gas outlet of the third separator is connected to the reheater, and the reheater, the fine dust removing device, the sulfur recovery device and the sulfur storage bin are connected in sequence; and a solid outlet of the third separator is connected to the thermal reduction tower using carbon.

2. The system according to claim 1, wherein the filtering device is provided with a chamber therein, a filter screen is disposed across the cross section of the chamber, a first outlet is disposed at the upper end of the filter screen, and a second outlet is disposed at the lower end of the filter screen.

3. The system according to claim 1, wherein a first dust collector is connected to the flue gas inlet of the desulfurization tower, and a flue between the first dust collector and the desulfurization tower is connected to an ozone generator.

4. The system according to claim 1, wherein the concentration device comprises a membrane concentration device and an MVR evaporation concentration device, an inlet of the membrane concentration device is connected to the tower kettle of the denitration tower, an outlet of the membrane concentration device is connected to an inlet of the MVR evaporation concentration device, and the pneumatic transporting device is disposed at the outlet of the MVR evaporating concentration device.

5. The system according to claim 1, wherein a feeder is disposed between the drying device and the roaster for reduction.

6. The system according to claim 1, wherein the fine dust removing device is a metal mesh filter or a ceramic filter.

7. A process for preparing sulfur from reduction of sulfate/nitrate by iron-carbon and recovering desulfurization/denitration agents, comprising:

subjecting a flue gas to dust removal, ozone oxidation, alkali washing desulfurization, and alkali washing denitration, and then discharging;

drying a sulfate precipitate produced in the alkali washing desulfurization and then transporting the dried sulfate precipitate together with carbon powder and iron powder at a set ratio to a roaster for reduction and conducting roasting reduction at a roasting temperature of 800° C. to 1100° C. for a roasting time of 4 to 200 s;

concentrating and crystallizing a nitrate solution produced in the alkali washing denitration to produce a nitrate powder, decomposing the nitrate powder at a high temperature into a solid metal oxide and a mixed gas, and delivering the mixed gas to the roaster for reduction such that the mixed gas is reduced to nitrogen by roasting;

separating an unroasted sulfate carried in the gas flowing out from an outlet of the roaster for reduction by a first separator, and then returning the separated unroasted sulfate to the roaster for reduction for further reaction;

separating a metal oxide and carbon powder in a gas flow from the first separator by a second separator and feeding into a filtering device, wherein the metal oxide is dissolved in water of the filtering device to form an alkali liquid, and the carbon powder is intercepted by the filtering device and dried for reuse;

subjecting remaining gas from the roaster for reduction to a dust removal by condensing and to a sulfur recovery, and then sequentially introducing the remaining gas back into the alkali washing desulfurization and the alkali washing denitration for treatment, and finally discharging.

8. The process according to claim 7, wherein the sulfate precipitate transported to the roaster for reduction has a particle diameter of 60 μm to 3 mm, the nitrate has a particle diameter of 60 μm to 3 mm, the carbon powder has a particle diameter of 60 μm to 3 mm, and the iron powder has a particle diameter of 60 μm to 500 μm.

9. The process according to claim 8, wherein a mass ratio of the sulfate, the carbon powder, and the iron powder in the roaster for reduction is (8-11):(1-2):(1-2).

10. The process according to claim 7, wherein the temperature for high-temperature decomposition of the nitrate powder is 400 to 600° C., and the reaction time is 10 to 200 s.

* * * * *